Aug. 8, 1944.   S. F. ANDERSON   2,355,500
CONFECTION PACKAGING MACHINE
Filed Oct. 18, 1941   3 Sheets-Sheet 1
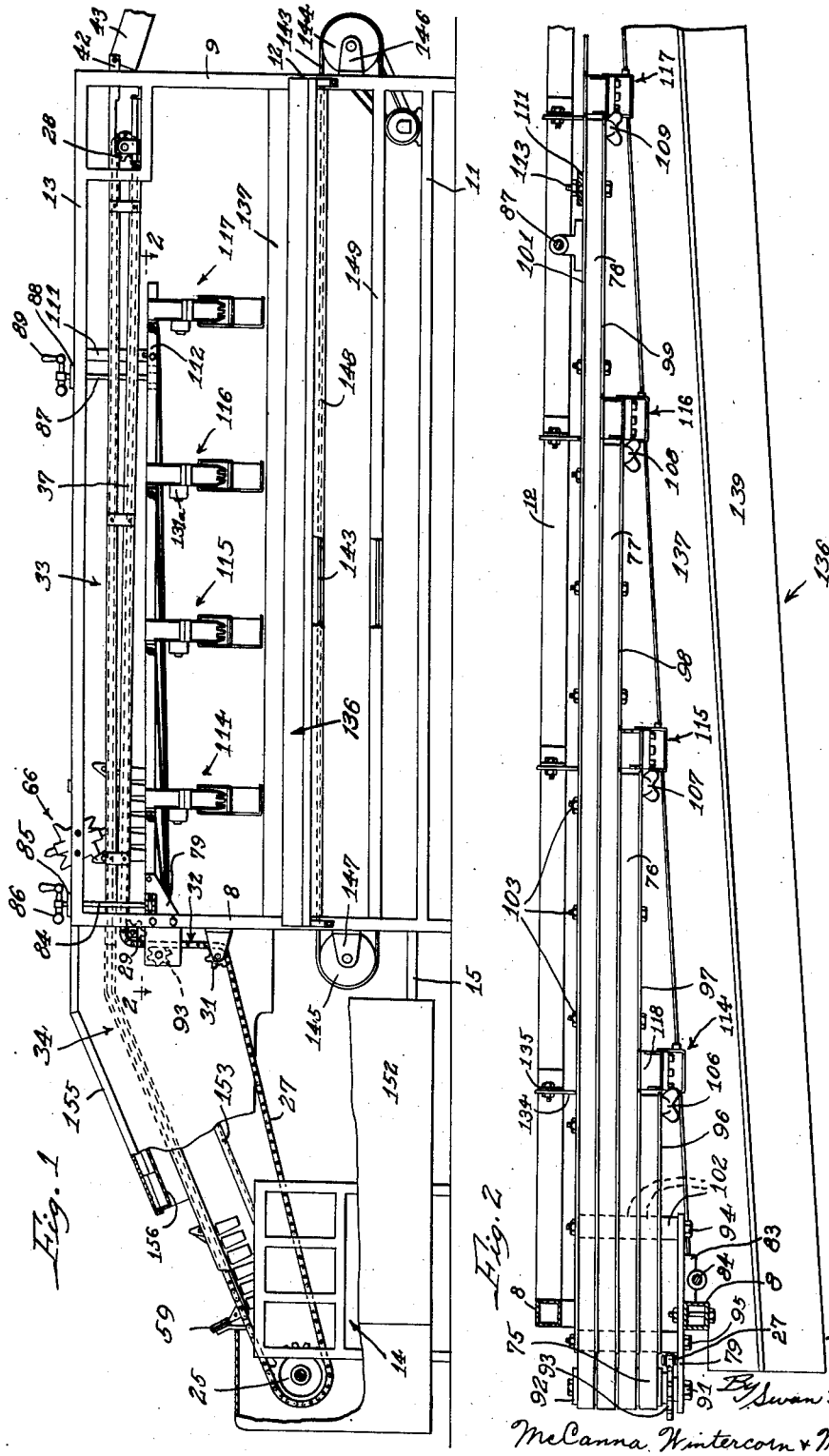

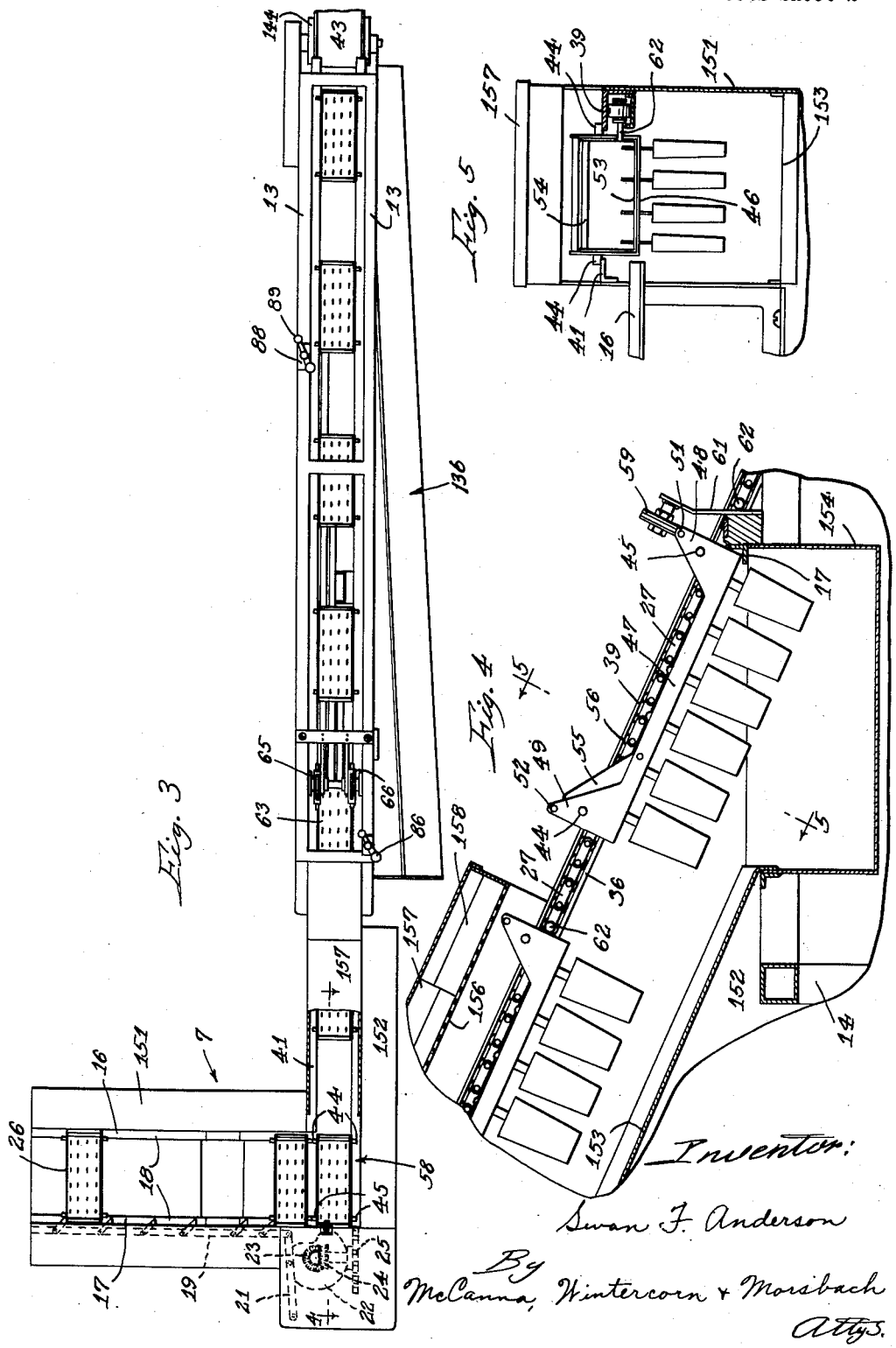

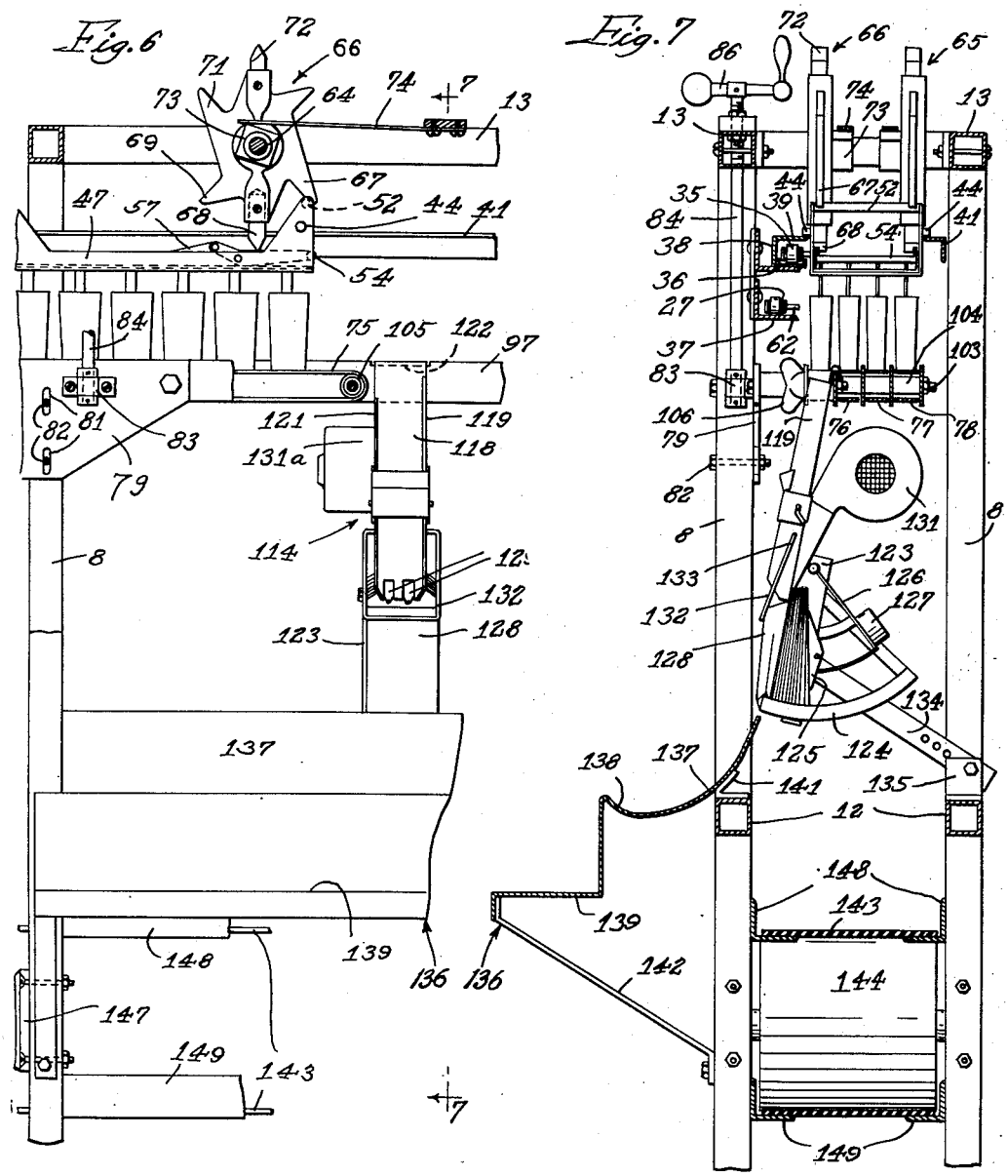

Patented Aug. 8, 1944

2,355,500

UNITED STATES PATENT OFFICE 2,355,500

CONFECTION PACKAGING MACHINE

Swan F. Anderson, Rockford, Ill.

Application October 18, 1941, Serial No. 415,545

12 Claims. (Cl. 226—2)

This invention relates to a device for packaging confections, and has special reference to a machine for bagging stick confections such, for example, as the common frozen confections carried on sticks.

An important object of the invention is the provision of an improved machine for transporting stick confections into position above a plurality of baggers and distributing the confections between the baggers.

A further object of the invention is the provision of an improved machine for inserting confections into bags.

Another object is the provision of an improved machine for removing stick confections from a stick holder, and distributing the confections to a plurality of baggers.

A still further object of the invention is the provision of a packaging machine having improved means for elevating a stick holder from a confection loading position to a confection distribution station, and for distributing the confections between a plurality of baggers from said distribution station.

I have also aimed to provide a novel confection packaging machine having generally improved characteristics, and operating on a novel principle for increasing the speed and simplifying the operation of packaging the confection.

Other objects and advantages will appear from the following description and the accompanying drawings, in which—

Figure 1 is a side elevational view partly in section showing a packaging machine embodying my invention;

Fig. 2 is a view taken substantially on the line 2—2 of Figure 1, showing the confection distributing belts;

Fig. 3 is a top view of the machine;

Fig. 4 is a view taken substantially on the line 4—4 of Fig. 3;

Fig. 5 is a section on the line 5—5 of Fig. 4;

Fig. 6 is a side elevational view partly in section showing the distribution station and the first bagger, and Fig. 7 is a vertical section taken substantially on the line 7—7 of Fig. 6.

The embodiment of the invention herein shown is adapted particularly for making candy coated ice cream confections such as the common chocolate coated ice cream bar on a stick, and includes a loading portion indicated generally by the numeral 7 (Fig. 3) at which the confection carried in stick holders is loaded onto the packaging machine. In this particular embodiment of the invention the loading portion has means for dipping the confection in a tank containing coating material, but within the purview of this invention such elements may or may not be present. The primary purpose of this portion of the device is to provide means at working level for the operator to load the packaging machine. In this portion of the device the stick holders are carried in a direction transverse to the remainder of the machine and brought into contact with a chain which elevates the holders to a point convenient for distribution of the confection. As the stick holders reach the elevated position, means are provided for tripping the holders to release the confection, and these articles drop slightly so that their bottoms come into contact with a plurality of belts traveling at substantially the same speed as the holder, the sticks remaining loosely in the stick holders. The belts are of successively greater length so that as the stick holder moves forward the confections drop off the ends of the belts into bagging devices arranged at the ends of the belts, and in this way the confections are distributed between the various baggers at a rate such that each bagger can be conveniently attended by a single operator.

The device includes a frame structure of conventional nature which includes spaced pairs of uprights 8 and 9, each pair being connected transversely of the machine to form a rigid structure and the pairs being connected by pairs of frame members 11, 12 and 13 interconnecting the uprights at opposite sides of the machine, as will be apparent from Figs. 1 and 2. In this instance a second frame portion designated generally by the numeral 14 is connected to the uprights 8 by means of interconnecting members 15, the frame portion 14 extending transversely of the machine. Disposed on the frame 14 are spaced ways 16 and 17 upon which stick holders are adapted to be seated, the ways being spaced so that the bottoms of the stick holder will rest thereon only adjacent their ends. The machine contemplates the use of a stick holder such as shown in United States Patent 2,232,196, issued February 18, 1941, to Ralph F. Anderson, this holder being adapted to receive and clamp the sticks as shown in said patent, and the confection being ordinarily formed on the sticks while so held, the confection depending therefrom as shown in Fig. 4. In this instance the holder is adapted to support four rows of confections spaced laterally of the holder, each row containing six confections. Disposed above the ways 16 and 17 are ratchet members 18 driven by suitable power operated mechanism, such as is well known in the art, one form being herein shown in diagrammatic form and including a reciprocating bar 19 adapted to carry the ratchet members, the bar being driven from a link 21 actuated by a cam 22 driven through reduction gearing from a motor, not shown, in accordance with conventional practice, the cam carrying a quarter turn gear 23 positioned to drive a second quarter turn gear 24 which acts through a stub shaft to drive a sprocket 25 for a purpose presently to be described. Thus rotation of the cam acts to reciprocate the rod 19 and thus move the stick holders herein designated generally by the numeral 26, forward on the ways 16 and 17 in a step by step fashion. The ways 16 and 17 are located in the region of waist level for the operator so as to be conveniently accessible for the placing of the stick holders thereon.

Trained over the sprocket 25 is a chain designated generally by the numeral 27 which extends the greater length of the frame somewhat below the upper frame member 13, as will best appear from Figs. 1 and 7, the chain being trained over a sprocket 28 adjacent the upright 9 and over a sprocket 29 on one of the uprights 8 and thence over a sprocket 31 disposed on the upright 8 in a lower plane than the sprocket 29 to provide a vertical span in the chain as indicated at 32 for a purpose presently to be described. Disposed along the front side of the machine slightly below the frame member 13 and extending from the upright 9 to a point adjacent the sprocket 25 is an angle member indicated generally by the numeral 33 (Figure 1), the channel iron extending in a general horizontal direction to a point beyond the upright 8 and then sloping downwardly as indicated at 34. This angle iron member forms a track or way for supporting the upper reach of the chain, the chain having rollers as indicated at 35 riding on an inwardly disposed ledge 36 of the way. A similar way designated generally by the numeral 37 is disposed below the channel iron 33 and serves to support the lower reach of the chain between the sprockets 28 and 29. Disposed within the channel iron 33 is a second inverted channel indicated generally by the numeral 38 in Fig. 7 which has a top ledge 39, the channel 38 extending the full length of the channel 33. An inverted channel 41 similar to the channel 38 is disposed on the opposite or rear side of the frame and extends in the same plane as the channel 38 to a point adjacent its intersection with the way 16 of the loading portion (note Fig. 3). The channels 38 and 41 form ways for support of the stick holders in their movement from the loading portion through the machine, these channels extending to a point slightly beyond the uprights 9 as indicated at 42 so as to carry the stick holders to a chute 43 by way of which the holders slide out of the machine. The stick holders 26 each have a plurality of projections along their sides adapted to ride on the angle iron ways 39 and 41, the holders in this instance having projections 44 adjacent one end and projections 45 adjacent the opposite end adapted to ride on these ways to support the stick holders in their movement under the action of the chain 27, as best shown in Fig. 7.

Referring now more particularly to Figs. 3, 4 and 5, the stick holders comprise a frame structure conveniently formed of sheet metal having a bottom plate 46 provided with openings, as described in the above-mentioned patent, the edges of the plate being upturned at the sides as indicated at 47 and having upstanding ears 48 and 39 on opposite sides thereof interconnected by rods 51 and 52. Seated on the plate 46 is an upper plate 53 adapted to be moved by a handle 54 (Fig. 6) having arms 55 pivoted to the opposed sides 47 as indicated at 56, the arms having links 57 attached thereto and to the plate 53 for the purpose of moving the plate 53 longitudinally with respect to the plate 46 and thereby squeezing the sticks between the holes of plates 46 and 43 or releasing the sticks, dependent upon the movement of the handle 54. As heretofore described, the stick holders are moved along the ways 16 and 17 in a step by step fashion until they approach a loading station occupied by the stick holder 58 in Fig. 3. As the stick holders approach this position, the rod 51 is forced under a rubber roller 59 carried on an upstanding bracket 61, which roller cooperates with the way 17 to support the forward end of the stick holder while the holder is moving across the space between the angle iron ways 39 and 41 under the action of the ratchet pawls 18. During this movement, the forward end of the stick holder moves off the way 16 and one of the pins or projections 44 is brought onto the way 39 and one of the pins 45 is likewise brought onto the way 39 as the stick holder is moved into the position shown in Figs. 4 and 5. Shortly after the stick holder reaches this position, movement of the chain brings a pin 62 into contact with the rear edge of one of the upstanding portions 48 sliding the stick holder forward on the way 39. Upon the first movement of the stick holder the other of the pins 44 moves onto the way 41 to give a three-point suspension for the stick holder. This movement of the stick holder moves the rear edge thereof off the way 17 and moves the rod 51 from under the roller 59 and the stick holder is carried forward with movement of the chain 27, the weight of the holder and its contents being supported on the pins 44 and 45 and the ways 39 and 41. Shortly after the stick holder 58 is moved out of position under the wheel 59, the next succeeding stick holder is brought into position by action of the pawls 18, and the operation is repeated so that the stick holders are carried by the chain in succession up the inclined portion 34 and thence along the frame in the manner shown in Fig. 3, the chain 27 having pins such as that shown at 62 spaced therealong.

Shortly after the stick holders reach the horizontal portion of the channel iron 33 they approach a distribution station in which the confections are released from the stick holder, the stick holder 63 being shown approaching this station in Figs. 3 and 6. The sticks are released from the stick holder as heretofore described by rotation of the handle 54 downward facing Fig. 6, and this is accomplished by means of a holder release mechanism shown in this figure. For this purpose a shaft 64 extends between the frame members 13 and carries two release members designated generally by the numerals 65 and 66 (Fig. 3). Since the release members are identical in form, only one will be described, these members being disposed in the same plane as the arms 55 of the stick holder so that they will contact these arms as the stick holder is moved forward by the chain. Each of these members consists of an outwardly disposed cam projection 67 adapted initially to occupy a position so that its point will be disposed in the path of the rod 52. As the stick holder moves forward, contact of the rod 52 with the cam portion 67 rotates the release member and brings a finger 68 into contact with the arm 55 of the stick holder. Continued forward movement of the stick holder causes the finger 68 to move the arm downward to the position shown in Fig. 6, thus moving the plate 53 of the stick holder and releasing the sticks from the holder. As the stick holder continues its movement the rod 51 of the stick holder comes into contact with a cam finger 69 of the release member, further rotating the release member to bring a cam finger 71 into the path of the rod 52 of the next succeeding stick holder so that a finger 72 will function to operate the next succeeding stick holder in the same manner. In order to prevent overtravel of the release member, the hub thereof is provided with a squared contour as shown at 73 against which a flat spring 74 operates. In this fashion the two release members 65 and 66 operate against the opposed arms 55 to release the sticks from the holders.

When the sticks of the confections are released from the holders, the confections drop down slightly into the position shown in Figs. 6 and 7, the lower ends of the confections coming to rest against a plurality of belts disposed therebelow. In this instance the belts are four in number and extend longitudinally of the frame below the stick holders, each of the belts being adapted to receive thereon one row of the confections as held in the stick holders, as will be apparent from Figs. 6 and 7, the belts herein being designated by the numerals 75, 76, 77 and 78, the belts being endless and being of progressively greater length as will be apparent from Fig. 2. These belts are supported on the frame structure primarily through a plate designated generally by the numeral 79, this plate being attached to the inner side of the front upright 8, the plate having slots as indicated at 81 through which screws or other fastening means 82 carried on the upright 8 pass to support the plate. Attached to the plate is a bearing 83 through which a supporting rod 84 passes, the rod having rotation with respect thereto and extending upwardly through the front frame member 13, as best shown in Fig. 7, the rod being threaded adjacent its upper end and having engagement with a threaded plate 85, whereby upon rotation of a handle 86 fixedly carried on the upper end of the rod, the plate 79 can be moved up and down so as to adjust the elevation thereof and the elevation of the belts supported thereby. The belts are also in part supported by a second rod 87 similarly attached to a portion of the belt frame structure and passing through a plate 88 carried on the rear frame member 13, the rod also having a handle 89 for rotation of the rod to adjustably support the end of the belt structure opposite the plate 79. Fixedly attached to the plate 79 is a spindle 91 upon which is rotatably carried a pulley 92 arranged in driven relationship with respect to a sprocket 93, the space relationship being such that the chain 27 engages the sprocket 93 in the vertical portion 32 thereof as will be seen from Figure 1, whereby the sprocket and the pulley 93 are driven by the chain 27. Also carried on the plate 79 are bolts 94 and 95 which pass through a plurality of spacer strips 96, 97, 98, 99 and 101, which spacer strips consist of strips of metal disposed in parallel spaced relation, the bolts 94 and 95 having a plurality of spacers as shown at 102 for supporting these strips and spacing the same. Spaced along the strips are bolts as indicated at 103 which pass through the strips for securing the strips together, spacers such as shown at 104 (Fig. 7) being disposed therebetween and the bolts being drawn up tight for the purpose of providing a rigid structure. These strips are of such width as to project a slight distance above and below the belts in the manner shown in Fig. 7, and serve as dividing strips to prevent lateral movement of the belts, and also serve as guides for the confections moving therealong and prevent their over-lapping onto adjacent belts. It will be seen that the strip 96 is of substantially shorter length than the strip 97, and likewise strips 98 and 99 are somewhat longer than their adjacent strips. Positioned at the end of the strip 96 is a pulley 105 over which the belt 75 is trained, the belt thence passing back over the pulley 92 to complete the circuit, the pulley 105 being supported on a wing headed bolt 106 permitting of removal of the pulley as well as adjustment of the tension of the belt. In the same manner pulleys (not shown) are positioned on wing headed bolts 107, 108 and 109, and the corresponding belts 76, 77 and 78 are disposed over these pulleys and trained back over the pulley 92. From this it will be seen that the belts are of progressively greater length and terminate at spaced intervals along the length of the frame. The outer end of the strips is supported on the rear frame member 13 by means of a depending arm 111 which has a slotted opening 112 through which a bolt 113 passes, the slotted opening permitting of adjustment of the elevation of the belts under the action of the rod 87 and handle 89. It will be seen that this adjustment is necessary to permit of raising the belts into closer proximity with the stick holders when confections of relatively short lengths are being made so that when the sticks are released from the stick holder, the confections will be supported on the belts at an elevation such that the sticks remain in the holder to keep the confections in upright position as they pass along the belts.

The arrangement is such that the belts 75 to 78 travel at the same speed as the stick holders so that when the confections are released and drop onto the belts, the confection and the holders are carried forward at the same speed. Viewing Fig. 6 it will be seen that shortly after the confections are released they reach a position in their forward movement at which the front row of confections begin to pass off the belt 75, and these confections drop off one by one as the stick holder passes the end of the belt 75. The remaining three rows of confections pass on until the end of the belt 76 is reached at which the second row are dropped one after the other from the end of the plate, the remaining two rows continuing in their movement until the end 77 is reached, at which the third row of confections drop one at a time from the end of the belt. The last row of confections are dropped at the end of the belt 78 to complete the distribution of the confections from the stick holder. The stick holder continues in its movement passing onto the slide 43 and moving down this slide under gravity to pass out of the packaging machine. This operation is continued as successive stick holders are moved along the frame under the action of the chain 27.

Positioned at the end of the belts are baggers designated generally by the numerals 114, 115, 116 and 117, the baggers being so disposed that the confection dropping off the belt will pass bottom first into the bagger and drop down therethrough under the force of gravity. These baggers are identical in construction and consequently only a single one need be described. Directing attention to Figs. 6 and 7, the bagger includes a chute 118, preferably formed of sheet metal, having upstanding side walls 119 and 121, the upper end of the chute being bent over as shown at 122 so as to hook over the adjacent strip separating the belts, in the case of Fig. 6 over the strip 97. Attached to the lower end of the chute is a bag support including a depending arm 123 carrying a segment 124 at its lower end upon which a plurality of bags are seated in parallelly disposed relationship with their open ends upwardly disposed as indicated in Fig. 7, the bags being adapted to be moved along the segment under the action of a plate 125 seated against the back of the stack and carried on a swing arm 126, in this instance having a way 127 adapted to urge the arm forward under the action of gravity to push the bags out to the forward side of the machine. The bags are of a type which have one side longer than the other, and the short side of the bag is placed forward in the stack. The distance between the segment 124 and the lower end of the chute is such that the forward end of the first bag is free to move outwardly beyond the end of the chute as indicated at 128 while the opposite side of the bag is retained under the action of spring fingers 129. A blower, indicated generally by the numeral 131 driven by a motor 131-a, is fastened against the back side of the chute and functions to provide a blast of air downwardly at the mouth of the chute to move air into the bag and thus distend the first bag by moving the forward side thereof outwardly in the manner shown in Fig. 7. The forward side of the bag is retained against excessive outward movement by a U-shaped wire arm 132 pivotally supported in the sides of the chute as indicated at 133. It will be seen that this arrangement acts to hold the front bag in open position at the bottom of the chute so that as the confection drops off the end of the belt and down the chute, it moves into the bag, the weight of the confection being such as to pull the top of the bag out from under the spring fingers 129 so that the bag and confection continue in a downward movement. The baggers are held in adjusted position by a bracket 134 having its lower end attached to upstanding ears 135 on the rear frame member 12, the upper end of the arm being attached to the depending bagger member 123. The bracket 134 has a plurality of holes for alternative reception of the bolts to permit of adjustment of the elevation of the belts as heretofore described.

Disposed along the front of the frame is a table designated generally by the numeral 136, the table having a curved rearward portion 137 (note Fig. 7), the upper edge of which substantially meets the front edge of the segment 124 so that the bag and confection will move off the segment and down the sloping portion of the table, the front edge of the sloping portion 137 turning upward as indicated at 138 to retard the movement of the bagged confection. Disposed along the front of the portion 137 is a shelf 139 providing an area on which the boxes or cartons are rested for packing of the individual confections into market size packages of suitable size. The table is supported by means of brackets 141 between the portion 137 and the front frame member 12 and by brackets 142 disposed between the front uprights 8 and 9 and the forward edge of the table, as best shown in Fig. 7.

Means are provided for transporting the cartons out of the machine, and this includes a belt 143 trained over pulleys 144 and 145 attached between the uprights 8 and the uprights 9, the pulleys being carried on brackets 146 and 147. Suitably the reaches of the belt may be supported on angle iron members 148 and 149 extending between the uprights for this purpose. It will be seen that in operation the device is attended by a plurality of operators, commonly an operator for each bagger seated in front of the table 136, the duty of these operators being to remove the bagged confection from the curved bag portion 137 of the table and arrange them in the cartons. Operators place the filled cartons onto the belt 143 for transportation to the end of the machine from whence they are normally placed in refrigerated rooms for storage.

As will best be seen from Figs. 1 and 3, the loading portion of the machine as well as that portion of the machine containing the inclined portion of the chain as indicated at 34 is enclosed by a housing, the housing for the loading portion being indicated by the numeral 151 and that for the inclined portion of the chain being designated by the numeral 152. Preferably the housing 152 is divided into a plurality of chambers, the housing having a transverse partition 153 spaced somewhat below the normal path of the confection, as will be seen from Fig. 4, this partition terminating in a box-like chamber 154 at the loading portion 7. The housing 152 extends above the chain 27, and the normal path of the stick holders as indicated at 155, and has a perforated transverse partition 156 providing an upper chamber 157. The purpose of this partition is to receive a supply of solid carbon dioxide or similar refrigeration agent for the purpose of refrigerating the confections as they pass up the inclined portions of the ways to the distribution station. It will thus be seen that the housing 152, transverse partition 153 and the upwardly disposed portion 155 of the housing form in effect a refrigeration chamber through which the confections are drawn during their movement to the elevated position. This acts to set the confection and to prevent any substantial melting during the distribution of the confection between the baggers and during its subsequent packaging and movement along the conveyer belt 143. It will also be seen that the cold carbon dioxide gas passing through the perforated plate 157 sinks downwardly into the box 154 and laterally along the loading portion 7 to obtain the maximum refrigeration effect in the limited space available.

I have thus described what I believe to be the preferred method of practicing the invention, but it will be understood that the present disclosure is by way of illustration and not limitation.

I claim:

1. The combination in a confection bagging machine of a frame having a loading station substantially at waist level, a packaging table for receiving bagged confections a stick holder for holding completed confections in a plurality of rows, a conveyor disposed longitudinally of said table for conveying said stick holders in succession from said loading station along said frame in an elevated plane, a plurality of baggers spaced longitudinally of said table a distance to provide space for side by side work by operators at each bagger, said baggers being disposed in a plane intermediate the table and said conveyer, and means for uniformly distributing successive rows of said confections to said baggers to drop therethrough and onto said table under gravity.

2. The combination in a confection bagging machine for stick confections, of a plurality of spaced baggers for applying bags to confections dropping therethrough under gravity, a confection distributor disposed above said baggers comprising conveyors for distributing confections to said baggers, a conveyer for conveying a stick holder holding a plurality of confections from a waist level loading position to a release station above said distributor and thence along the machine above said baggers, and means for releasing said confections from the stick holder at said release station for distribution between said baggers by said distributor.

3. The combination in a confection bagging machine of a plurality of baggers for applying bags to confections passing therethrough, said baggers each having a chute for receiving confections in succession, a confection distributor comprising a plurality of parallelly disposed conveyers above said baggers each leading to the chute of one of said baggers, a conveyer located above said distributor for conveying a stick holder thereabove, a stick holder movable by said conveyer at substantially the same speed as said distributor, said holder having means for gripping the sticks of a plurality of confections, and means operative in response to movement of the holder by said conveyer for releasing the grip of the holder on said sticks to cause said confections to drop into supporting contact with said distributor conveyers and thereafter drop under gravity from said holder and said distributor conveyers into said bagger chutes at the end of each distributor conveyer to divide the contents of the stick holder between said baggers.

4. The combination recited in claim 3 wherein means are provided for varying the distance between said conveyer and said distributor to accommodate confections of different sizes.

5. The combination recited in claim 3 wherein means are provided for supporting said distributor for adjusting movement in a vertical plane, and screw means are provided for moving said distributor between any of a plurality of different positions with respect to the holder conveyer to accommodate confections of different sizes.

6. The combination in a confection bagging machine of a plurality of baggers located at spaced bagging stations for applying bags to confections passing therethrough, a confection distributor comprising a plurality of parallelly disposed conveyers each leading to one of said bagging stations for dropping confections under gravity into said baggers, a stick holder for holding a plurality of stick confections, said stick holder having releasable means for gripping the sticks of the confections, a stick holder conveyer for conveying said holders in a plane above said distributor, means operative in response to movement of said holder by said conveyer through a distribution station for releasing said gripping means to cause the confections to drop under gravity into supporting contact with said distributor conveyers, and means for driving said holder conveyer and said distributor conveyers at substantially the same speed to move the confections along the distributor and cause the same to drop under gravity into said baggers and thereby divide the contents of said stick holder between said bagging stations.

7. The combination in a confection bagging machine of a plurality of baggers located at spaced bagging stations for applying bags to confections passing therethrough, a confection distributor comprising a plurality of parallelly disposed endless conveyer belts, each belt reversing at one of said bagging stations to drop confections under gravity into said baggers, a stick holder for holding a plurality of stick confections in rows corresponding to the number of said conveyer belts, said stick holder having releasable means for gripping the sticks of the confections, a stick holder conveyer for conveying said holders in a plane above said distributor, means operative in response to movement of said holder by said conveyer through a distribution station for releasing said gripping means to cause the confections to drop under gravity into supporting contact with said distributor conveyers, the space between said distributor conveyers and said holder conveyer being such that when so released the sticks of said confection remain in the stick holder for lateral support, and means for driving said holder conveyer and said distributor conveyers at substantially the same speed to move the confections and the stick holder along the distributor and cause the confections to drop under gravity into said baggers and thereby divide the contents of said stick holders between said bagging stations.

8. The combination in a confection bagging machine of a plurality of baggers located at spaced bagging stations for applying bags to confections passing therethrough, a confection distributor comprising a plurality of parallelly disposed conveyers each leading to one of said bagging stations for dropping confections into said baggers, a stick holder for holding a plurality of stick confections in a plurality of rows, said stick holder having releasable means for gripping the sticks of the confections, a stick holder conveyer for conveying said stick holder from a loading station substantially at waist level to an elevated distribution station above said distributor and thence in parallel relation with said distributor, said stick holder being separate from said stick holder conveyor, means operative in response to movement of said holder by said holder conveyer through said distribution station for releasing said gripping means to cause the confections to drop under gravity into supporting contact with said distributor conveyers, means for driving said holder conveyer and said distribution conveyers at substantially the same speed to move the confections along the distributor and cause the same to drop into said baggers and thereby divide the contents of said stick holder between said bagging stations, and loading means driven in timed relation to said holder conveyer for periodically loading stick holders carrying completed confections ready for bagging onto said holder conveyer at said loading station.

9. The combination in a confection bagging machine of a plurality of baggers located at spaced bagging stations for applying bags to confections passing therethrough, a confection distributor comprising a plurality of parallelly disposed conveyers each leading to one of said bagging stations for dropping confections into said baggers, a stick holder for holding a plurality of stick confections in a plurality of rows, said stick holder having releasable means for gripping the sticks of the confections, a stick holder conveyer for conveying said stick holder from a loading station substantially at waist level to an elevated distribution station above said distributor and thence in parallel relation with said distributor, said stick holder being separate from said stick holder conveyor, means operative in response to movement of said holder by said holder conveyer through said distribution station for releasing said gripping means to cause the confections to drop under gravity into supporting contact with said distributor conveyers, means for driving said holder conveyer and said distribution conveyers at substantially the same speed to move the confections along the distributor and cause the same to drop into said baggers and thereby divide the contents of said stick holder between said bagging stations, and loading means for periodically loading stick holders carrying completed confections ready for bagging onto said holder conveyer comprising ways disposed at right angles with respect to said holder conveyer, upon which said stick holders rest, and a plurality of pawls reciprocated in timed relation with said holder conveyer for sliding said holders along said ways onto said holder conveyer.

10. The combination in a confection bagging machine of a plurality of baggers located at spaced bagging stations for applying bags to confections passing therethrough, a confection distributor comprising a plurality of conveyers each leading to one of said bagging stations for dropping confections into said baggers, a stick holder for holding a plurality of stick confections, said stick holder having releasable means for gripping the sticks of the confections and having projections on its opposite sides, a stick holder conveyer for conveying said stick holders from a loading station substantially at waist level to an elevated distribution station above said distributor and thence in parallel relation with said distributor, said holder conveyer comprising spaced ways for reception of the projections on said stick holder and an endless chain extending the length of said ways and having means for engaging said holder for moving the same along said ways, releasing means disposed in the path of said stick holder during its movement along said ways through a distribution station for releasing said gripping means to cause the confections to drop under gravity into supporting contact with said distributor conveyers, and means for driving said distributor conveyers from said chain at substantially the same speed as said holder to move the confections and the holder along the distributor and cause the confections to drop into said baggers at the ends of said distributor conveyers and thereby divide the contents of said stick holder between said bagging stations.

11. The combination recited in claim 10 wherein means are provided for loading stick holders onto said holder conveyer at spaced intervals comprising spaced loading ways disposed substantially at right angles to the ways of said holder conveyer, pawls for sliding said holders along said loading ways onto said holder conveyer ways, and means engaging one end of said holder to support the opposite end thereof during its movement from the loading ways to the holder conveyer ways.

12. The combination recited in claim 10 wherein a portion of the return reach of said chain is vertically disposed, and wherein said distributor has a sprocket engaging said vertical portion for driving the distributor, and means for adjusting the elevation of said distributor.

SWAN F. ANDERSON.